US007809548B2

(12) United States Patent
Mihalcea et al.

(10) Patent No.: US 7,809,548 B2
(45) Date of Patent: Oct. 5, 2010

(54) GRAPH-BASED RANKING ALGORITHMS FOR TEXT PROCESSING

(75) Inventors: Rada Mihalcea, Denton, TX (US); Paul Tarau, Denton, TX (US)

(73) Assignee: University of North Texas, Denton, TX (US)

(*) Notice: Subject to any disclaimer, the term of this patent is extended or adjusted under 35 U.S.C. 154(b) by 1273 days.

(21) Appl. No.: 11/075,625

(22) Filed: Mar. 9, 2005

(65) Prior Publication Data

US 2005/0278325 A1     Dec. 15, 2005

Related U.S. Application Data

(60) Provisional application No. 60/579,372, filed on Jun. 14, 2004.

(51) Int. Cl.
G06F 17/20 (2006.01)
G06F 17/27 (2006.01)
G06F 17/00 (2006.01)

(52) U.S. Cl. .............. 704/1; 704/9; 715/200; 715/211

(58) Field of Classification Search .......... 704/1–10, 704/260
See application file for complete search history.

(56) References Cited

U.S. PATENT DOCUMENTS

| 6,112,203 | A  | * | 8/2000  | Bharat et al.  | 1/1    |
| 6,285,999 | B1 | * | 9/2001  | Page           | 1/1    |
| 6,480,843 | B2 | * | 11/2002 | Li             | 707/5  |
| 7,286,977 | B1 | * | 10/2007 | Carter et al.  | 704/9  |
| 7,403,890 | B2 | * | 7/2008  | Roushar        | 704/9  |
| 7,519,613 | B2 | * | 4/2009  | Guha et al.    | 1/1    |
| 2003/0226100 | A1 | * | 12/2003 | Farahat et al. | 715/500 |
| 2005/0246328 | A1 | * | 11/2005 | Zhang et al.   | 707/3  |

FOREIGN PATENT DOCUMENTS

WO    WO 02/10985 A2    2/2002

OTHER PUBLICATIONS

Christiane Fellbaum, Derek Gross, and Katherine Miller, Adjectives in WordNet, 1993, pp. 26-39.*

Lawrie, D., Croft, W. B., and Rosenberg, A. 2001. Finding topic words for hierarchical summarization. In Proceedings of the 24th Annual international ACM SIGIR Conference on Research and Development in information Retrieval (New Orleans, Louisiana, United States). SIGIR '01. ACM, New York, NY, 349-357. DOI= http://doi.acm.org/10.1145/383952.384022.*

(Continued)

Primary Examiner—Talivaldis Ivars Smits
Assistant Examiner—Matthew H Baker
(74) Attorney, Agent, or Firm—Jackson Walker L.L.

(57) ABSTRACT

The present invention provides a method of processing at least one natural language text using a graph. The method includes determining a plurality of text units based upon the natural language text, associating the plurality of text units with a plurality of graph nodes, and determining at least one connecting relation between at least two of the plurality of text units. The method also includes associating the at least one connecting relation with at least one graph edge connecting at least two of the plurality of graph nodes and determining a plurality of rankings associated with the plurality of graph nodes based upon the at least one graph edge. The method can also include a graphical visualization of at least one important text unit in a natural language text or collection of texts. Methods for word sense disambiguation, keyword extraction, and sentence extraction are also provided.

47 Claims, 8 Drawing Sheets

OTHER PUBLICATIONS

Varadarajan, R. and Hristidis, V. 2005. Structure-based query-specific document summarization. In Proceedings of the 14th ACM international Conference on information and Knowledge Management (Bremen, Germany, Oct. 31-Nov. 5, 2005). CIKM '05. ACM, New York, NY, 231-232. DOI= http://doi.acm.org/10.1145/1099554.1099602.*

Erkan, G. and Radev, D. R. 2004. LexRank: graph-based lexical centrality as salience in text summarization. J. Artif. Int. Res. 22, 1 (Jul. 2004), 457-479.*

Toutanova, K., Manning, C. D., and Ng, A. Y. 2004. Learning random walk models for inducing word dependency distributions. In Proceedings of the Twenty-First international Conference on Machine Learning (Banff, Alberta, Canada, Jul. 4-8, 2004). ICML '04, vol. 69. ACM, New York, NY, 103. DOI= http://doi.acm.org/10.1145/1015330.1015442.*

Brew, C. and Schulte im Walde, S. 2002. Spectral clustering for German verbs. In Proceedings of the Acl-02 Conference on Empirical Methods in Natural Language Processing—vol. 10 Annual Meeting of the ACL. Association for Computational Linguistics, Morristown, NJ, 117-124. DOI= http://dx.doi.org/10.3115/1118693.1118709.*

Salton, G., Singhal, A., Mitra, M., and Buckley, C. 1997. Automatic text structuring and summarization. Inf. Process. Manage. 33, 2 (Mar. 1997), 193-207. DOI= http://dx.doi.org/10.1016/S0306-4573(96)00062-3.*

Marti Hearst, Christian Plaunt. Subtopic Structuring for Full-Length Document Access (1993).*

International PCT Search US2005/015630 Report dated May 5, 2005.

G. Ramakrishnan et al., "Text Representation with WordNet Synsets using Soft Sense Disambiguation" Jun. 2003 *Natural Language Processing and Information Systems, 8th International Conference on Applications of Natural Language to Information Systems*, Burg (Spreewald) Germany XP002383976.

M. Galley et al., "Improving Word Sense Disambiguation in Lexical Chaining" Aug. 2003, *Proceedings the 18th International Joint Conference on Artificial Intelligence (IJCAI-03)*, Acapulco, Mexico, XP002383977.

M. Sussna, "Word Sense Disambiguation for Free-Text Indexing Using a Massive Semantic Network" 1993, *ACM Press, Proceedings of the Second International Conference on Information and Knowledge Management*, pp. 67-74, Washington, D.C., USA XP002383978.

K. Fragos et al., "Word Sense Disambiguation using Wordnet Relations" Oct. 2003 *Proceedings of 1st Balkan Conference in Informatics* Thessaloniki Greece XP002383979.

Rada Mihalcea et al., "PageRank on Semantic Networks, with application to Word Sense Disambiuagtion" Aug. 2004, *Proceedings of the 20th International Conference on Computational Linguistics* (Coling 2004), Geneva Switzerland, XP002383980.

S. Brin et al., "The Anatomy of a Large Scale Hypertextual Web Search Engine" Apr. 1998, *Computer Networks and ISDN Systems*, North Holland Publishing, Amsterdam, NL. pp. 107-117, XP004121435.

M. Lesk, "Automatic Sense Disambiguation using Machine Readable Dictionaries: How to Tell a Pine Cone from an Ice Cream Cone" 1986, *Proceedings of the Annual International Conference on Systems Documentation*, pp. 24-26, XP002224563.

Brill, E., Transformation-based error driven learning and natural language processing: A case study in part-of-speech tagging. *Computational Linguistics 21*, 4 (Dec. 1995), 543-566.

Brin, S., and Page, L., The anatomy of a large-scale hypertextual Web search engine. *Computer Networks and ISDN Systems 30*, 1-7 (1998), 107-117.

Cowie, J., Guthrie, L., and Guthrie, J. Lexical disambiguation using simulated annealing. In *Proceedings of the 5th International Conference on Computational Linguistics COLING-92* (1992), pp. 157-161.

DUC. Document understanding conference 2002.

Erkan, G. and Radev, D. LexRank: Graph-based Lexical Centrality as Salience in Text Summarization. In *Journal of Artificial Intelligence*, Dec. 2004.

Frank, E., Paynter, G.~W., Witten, I.~H., Gutwin, C., and Nevill-Manning, C.~G. Domain-specific keyphrase extraction. In *Proceedings of the 16th International Joint Conference on Artificial Intelligence* (1999), Morgan Kaufmann Publishers Inc., pp. 668-673.

Gale, W., Church, K., and Yarowsky, D. One sense per discourse. In *Proceedings of the DARPA Speech and Natural Language Workshop* (Harriman, New York, 1992).

Herings, P., van der Laan, G., and Talman, D. Measuring the power of nodes in digraphs. *Tech. rep., Tinbergen Institute*, 2001.

Hobbs, J. A model for natural language semantics. Part I: The model. *Tech. rep., Yale University*, 1974.

Hulth, A. Improved automatic keyword extraction given more linguistic knowledge. In *Proceedings of the 2003 Conference on Empirical Methods in Natural Language Processing* (Japan, Aug. 2003).

Kamvar, S., Haveliwala, T., Manning, C., and Golub, G. Extrapolation methods for accelerating PageRank computations. In *Proceedings of the 12th International World Wide Web Conference* (2003).

Kilgarriff, A., and Rosenzweig, R. Framework and results for English Senseval. *Computers and the Humanities 34* (2000), 15-48.

Kleinberg, J. Authoritative sources in a hyperlinked environment. *Journal of the ACM 46*, 5 (1999), 604-632.

Lesk, M. Automatic sense disambiguation using machine readable dictionaries: How to tell a pine cone from an ice cream cone. In *Proceedings of the SIGDOC Conference 1986* (Toronto, Jun. 1986).

Lin, C., and Hovy, E. Automatic evaluation of summaries using n-gram co-occurrence statistics. In *Proceedings of Human Language Technology Conference (HLT-NAACL 2003)* (Edmonton, Canada, May 2003).

Lin, C., and Hovy, E. The potential and limitations of sentence extraction for summarization. In *Proceedings of the HLT/NAACL Workshop on Automatic Summarization* (Edmonton, Canada, May 2003).

Lin, D. Principar—an efficient, broad-coverage, principle-based parser. In *In Proceedings of the Fifteenth International Conference on Computational Linguistics COLING-ACL '94* (Kyoto, Japan, 1994), pp. 42-48.

Miller, G., Leacock, C., Randee, T., and Bunker, R.} A semantic concordance. In *Proceedings of the 3rd DARPA Workshop on Human Language Technology* (Plainsboro, New Jersey, 1993), pp. 303-308.

Morris, J., and Hirst, G. Lexical cohesion, the thesaurus, and the structure of text. *Computational Linguistics 17*, 1 (1991), 21-48.

Patwardhan, S., Banerjee, S., and Pedersen, T. Using measures of semantic relatedness for word sense disambiguation. In *Proceedings of the Fourth International Conference on Intelligent Text Processing and Computational Linguistics CICLING-2003* (Mexico City, Feb. 2003).

Rada, R., Mili, H., Bickell, E., and Blettner, B.} Development and application of a metric on semantic nets. *IEEE Transactions on Systems, Man and Cybernetics 19* (Jan./Feb. 1989), 17-30.

Raghavan, S., and Garcia-Molina, H.} Representing Web graphs. In *Proceedings of the IEEE International Conference on Data Engineering* (Mar. 2003).

Resnik, P. Selectional preference and sense disambiguation. In *Proceedings of ACL Siglex Workshop on Tagging Text with Lexical Semantics, Why, What and How?* (Washington DC, Apr. 1997).

Salton, G., Singhal, A., Mitra, M., and Buckley, C. Automatic text structuring and summarization. *Information Processing and Management 2*, 32 (1997).

Stetina, J., Kurohashi, S., and Nagao, M. General word sense disambiguation method based on a full sentential context. In *Usage of WordNet in Natural Language Processing, Proceedings of COLING-ACL Workshop* (Montreal, Canada, Jul. 1998).

Teufel, S., and Moens, M. Sentence extraction as a classification task. In *ACL/EACL workshop on "Intelligent and scalable Text summarization"* (Madrid, Spain, 1997), pp. 58-65.

Turney, P. Learning to extract keyphrases from text. *Tech. rep., National Research Council, Institute for Information Technology*, 1999.

Vanderwende, L., Banko, M. and Menezes, A. Event-Centric Summary Generation. In *Document Understanding Conference at HLT-NAACL*, Boston, 2004.

Wolf, F and Gibson, E. Paragraph-, word-, and coherence-based approaches to sentence ranking: A comparison of algorithm and human performance. In *Proceedings of the 42nd Annual Meeting of the Association for Computational Linguistics* . Barcelona, Spain, Jul. 2004.

Yarowsky, D. One sense per collocation. In *Proceedings of the ARPA Human Language Technology Workshop* (1993).

* cited by examiner

GRAPH-BASED RANKING ALGORITHMS FOR TEXT PROCESSING

CROSS REFERENCE TO RELATED APPLICATIONS

This application claims priority to the U.S. Provisional Patent Application 60/579,372, filed on Jun. 14, 2004, which is expressly incorporated herein by reference.

BACKGROUND OF THE INVENTION

1. Field of the Invention

This invention relates generally to text processing, and, more particularly, to graph-based ranking for text processing.

2. Description of the Related Art

Automated natural language processing techniques may be used to perform a variety of tasks, including word sense disambiguation, keyphrase extraction, sentence extraction, automatic summarization of text, and the like.

Word sense disambiguation is a technique for assigning the most appropriate meaning to a polysemous word within a given context. Word sense disambiguation is considered essential for applications that use knowledge of word meanings in open text, such as machine translation, knowledge acquisition, information retrieval, and information extraction. Accordingly, word sense disambiguation may be used by many commercial applications, such as automatic machine translation (e.g. see the translation services offered by www.altavista.com, www.google.com), intelligent information retrieval (helping the users of search engines find information that is more relevant to their search), text classification, and others.

Conventional techniques for word sense disambiguation have concentrated on supervised learning, where each sense-tagged occurrence of a particular word is transformed into a feature vector, which is then used in an automatic learning process. However, the applicability of such supervised algorithms is limited only to those few words for which sense tagged data is available, and their accuracy is strongly connected to the amount of labeled data available at hand. Open-text knowledge-based approaches for word sense disambiguation have received significantly less attention. While the performance of such knowledge intensive methods is usually exceeded by their corpus-based alternatives, they have however the advantage of providing larger coverage. Knowledge-based methods for word sense disambiguation are usually applicable to all words in open text, while corpus-based techniques target only few selected words for which large corpora are made available. Four main types of knowledge-based methods have been developed for word sense disambiguation: Lesk algorithms, semantic similarity, local context, selectional preference, and heuristic-based methods.

Keyphrase extraction may be used for automatic indexing (e.g. indexing terms for books, which may be much needed in libraries, or by other cataloging services), terminology extraction, or as input to other applications that require knowledge of what are the important keywords in a text, e.g. word sense disambiguation or text classification. The task of a keyword extraction application is to automatically identify a set of terms that best describe a text. Such keywords may constitute useful entries for building an automatic index for a document collection, can be used to classify a text, or may serve as a concise summary for a given document. Moreover, a system for automatic identification of important terms in a text can be used for the problem of terminology extraction, and construction of domain-specific dictionaries. The same algorithm can be applied for term extraction (e.g. to extract important terms in medical literature), or for producing short summaries of large texts.

One conventional technique for keyword extraction uses a frequency criterion to select the "important" keywords in a document. However, this method was generally found to lead to poor results, and consequently other methods were explored. Supervised learning methods, where a system is trained to recognize keywords in a text, based on lexical and syntactic features typically provide better results than the frequency criterion. In this technique, parameterized heuristic rules are combined with a genetic algorithm to form a system for keyphrase extraction that automatically identifies keywords in a document. One known supervised learning method is called GenEx. A learning algorithm that applies a Naive Bayes learning scheme to the document collection achieves improved results when applied to the same data set as used by the GenEx algorithm. A 29.0% precision is typically achieved with GenEx for five keyphrases extracted per document and an 18.3% precision achieved by the Naive Bayes learning scheme for fifteen keyphrases per document.

The performance of supervised learning system can be improved by incorporating additional information or limiting the type of document. For example, when a supervised learning system is applied to keyword extraction from abstracts using a combination of lexical and syntactic features, accuracy may improve over previously published results. Keyword extraction from abstracts is more widely applicable than from full texts, since many documents on the Internet are not available as full-texts, but only as abstracts. Integrating part of speech information into the learning process may also improve the performance of supervised learning algorithms. The accuracy of the system may also be increased by adding linguistic knowledge to the term representation.

Various algorithms for sentence extraction and/or automatic summarization of text have also been proposed. With the huge amount of information available these days, the task of automatic summarization is becoming increasingly important. Sentence extraction and/or automatic summarization may be of high interest for many companies or other agencies dealing with large amounts of data. For example, government agencies may use these techniques to summarize the huge volume of messages they receive daily. Search engines may use them to provide users with concise summaries of the documents found by user searches and news agencies may use them to build abstracts for the everyday news.

Conventional natural language processing algorithms do not, however, utilize graph-based ranking algorithms, at least in part because of the difficulty of determining an appropriate graphing scheme.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for processing at least one natural language text using a graph. The method includes determining a plurality of text units based upon the natural language text, associating the plurality of text units with a plurality of graph nodes, and determining at least one connecting relation between at least two of the plurality of text units. The method also includes associating the at least one connecting relation with at least one graph edge connecting at least two of the plurality of graph nodes and determining a plurality of rankings associated with the plurality of graph nodes based upon the at least one graph edge. Methods for word sense disambiguation, keyword extraction, sentence extraction, and graphical presentation are also provided.

BRIEF DESCRIPTION OF THE DRAWINGS

The invention may be understood by reference to the following description taken in conjunction with the accompanying drawings, in which like reference numerals identify like elements, and in which.

Figure 1:
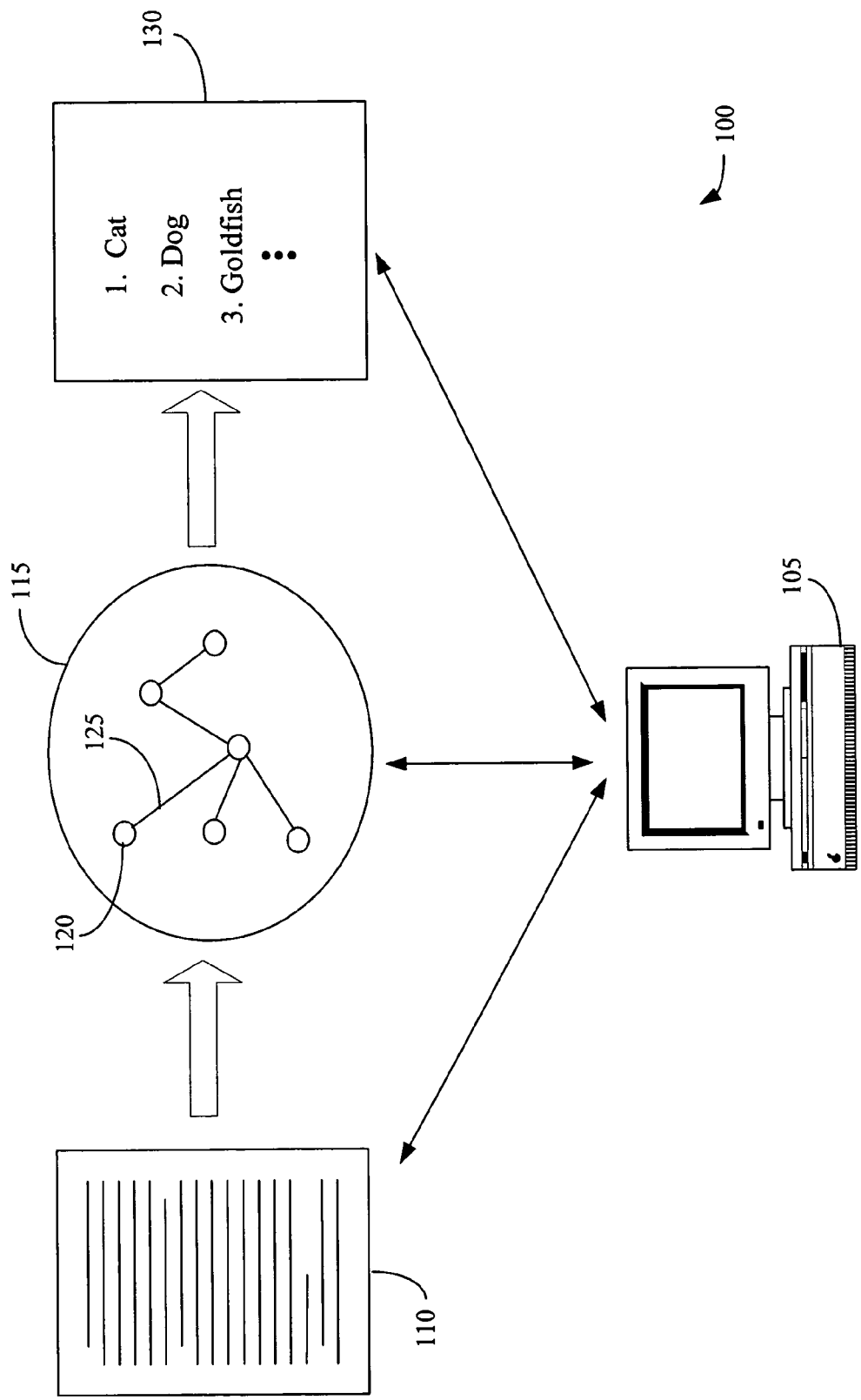
FIG. 1 shows a system for implementing a graph-based ranking algorithm for natural language text processing, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, a system 100 for implementing a graph-based ranking algorithm for natural language text processing is shown. In the illustrated embodiment, the system 100 includes a processing unit 105, which may be any desirable type of processing unit 105 including, but not limited to, a desktop computer, a laptop computer, and the like. Furthermore, the processing unit 105 may be implemented in any desirable combination of hardware and/or software. For example, the processing unit 105 may include a plurality of software modules that are implemented on one or more hardware devices.

The processing unit 105 can access a natural language text or collection of texts 110 that includes a plurality of text units. In various alternative embodiments, the natural language text or collection of texts 110 may be in any desirable format including, but not limited to, formats associated with known word processing programs, markup languages, and the like. Furthermore, the texts 110 can be in any language or combination of languages. The text units may include any desirable type of text units including, but not limited to, open class words, closed class words, other predefined word sets, combinations thereof, and the like. As will be discussed in detail below, the processing unit 105 can identify and/or select text units from the natural language text 110. The processing unit 110 can also determine various connecting relations between the text units and form a graph 115 based upon the text units and the connecting relations. The graph 115 includes graph nodes 120 (only one shown in FIG. 1) associated with the text units and graph edges 125 (only one shown in FIG. 1) associated with the connecting relations.

The processor 110 may then run a graph-based ranking algorithm on the graph 115 to rank the graph nodes 120 and/or the associated text units. Although the discussion that follows assumes that the graph nodes 120 are ranked, persons of ordinary skill in the art should appreciate that the present invention is not limited to ranking the graph nodes 120. In alternative embodiments, any portion of the graph 115 may be ranked. For example, the graph edges 125 may be ranked instead of, or in addition to, the ranking of the graph nodes 120.

The results of running the graph-based ranking algorithm on the graph 115 may be represented as a list or table 130 consisting of ranked text units. As used herein, the term "graph-based ranking algorithm" refers to techniques for deciding on the relative importance of a vertex (e.g. the graph nodes 120) within a graph, such as the graph 115, based on information drawn from the graph structure. For example, a graph-based ranking algorithm may rank the graph nodes 120 by taking into account global information recursively computed from the graph 115 based on the graph edges 125, rather than relying only on local vertex-specific information. The basic idea implemented by a graph-based ranking model is that of "voting" or "recommendation". When a first vertex links to a second vertex, e.g. via a connecting relations or graph edge 125, the first vertex is casting a vote for the second vertex. The higher the number of votes that are cast for a vertex, the higher the importance of the vertex.

In one embodiment, the results of running the graph-based ranking algorithm on the graph 115 may also be represented as a modified document (or documents) that provides a visual indication for each text unit based on the plurality of rankings. For example, highly ranked text units (or other selected portions of the document or documents) may be presented as highlighted portions of the document or documents. The highlighting may use colors that are selected based on the ranking. For example, the highest ranked portions may be presented as red text (or red highlighted text), middle ranked portions may be presented as yellow text (or yellow highlighted text), and the lowest ranked portions may be presented as black text (or text that is not highlighted).

Figure 2:
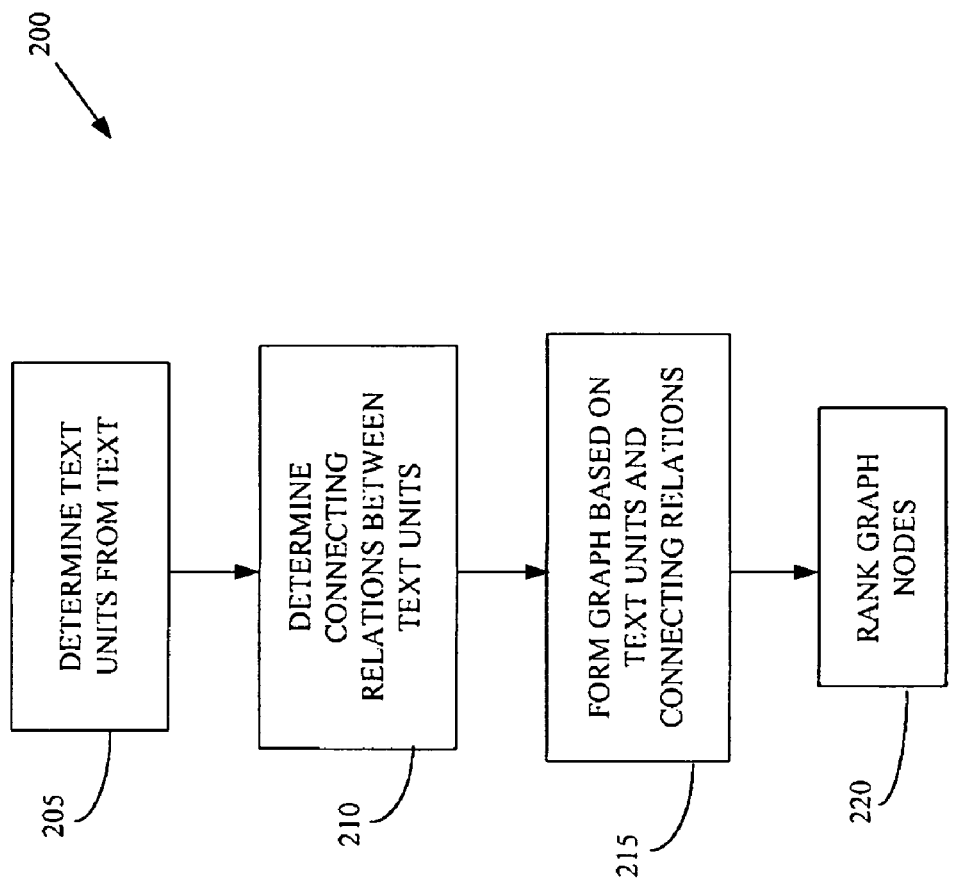
FIG. 2 conceptually illustrates one exemplary embodiment of a method for ranking text units in a natural language text based on a graph, in accordance with the present invention.

FIG. 2 conceptually illustrates one exemplary embodiment of a method 200 for ranking text units in a natural language text based on a graph. Embodiments of the method 200 may be referred to hereinafter as TextRank, or the TextRank algorithm. In the illustrated embodiment, text units are determined (at 205) from a text, such as a natural language text. In various alternative embodiments, text units of various sizes and characteristics can be added as vertices in the graph. For example, the text units may be words, collocations, word-senses, entire sentences, documents, any other desirable text units, and/or any combination thereof. One or more connecting relations between the text units are determined (at 210). Examples of connecting relations include, but are not limited to, lexical and/or semantic relations, contextual overlap, co-occurrence, and the like. A graph is then formed (at 215) using the text units and the connecting relations. For example, the text units may be associated with vertices or graph nodes in the graph and the connecting relations may be used to define graph edges connecting the graph nodes.

The graph nodes are then ranked (at 220) based on the graph. In one embodiment, a variable G=(V, E) is used to represent a directed graph, such as the graph formed (at 215) as discussed above, with the set of vertices V and set of edges E, where E is a subset of V×V. For a given vertex $V_i$, the set $In(V_i)$ is a set of vertices that point to the vertex $V_i$ (predecessors), and set $Out(V_i)$ is a set of vertices that vertex $V_i$ points to (successors). The graph nodes may then be ranked (at 220) using any desirable graph-based algorithm.

In one embodiment, the graph nodes may be ranked (at 220) using Kleinberg's Hyperlinked Induced Topic Search (HITS) algorithm, which is an iterative algorithm that was designed for ranking Web pages according to their degree of "authority". The HITS algorithm makes a distinction between "authorities" (pages with a large number of incoming links) and "hubs" (pages with a large number of outgoing links). For each vertex, HITS produces two sets of scores—an "authority" score, $HITS_A$, and a "hub" score, $HITS_H$, which are defined by the relations:

$$HITS_A(V_i) = \sum_{V_j \in In(V_i)} HITS_H(V_j)$$

$$HITS_H(V_i) = \sum_{V_j \in Out(V_i)} HITS_A(V_j).$$

An alternative embodiment of the graph-based ranking algorithm is the positional power function, which is a ranking algorithm that determines the score of a vertex as a function that combines both the number of its successors and the score of its successors as in the equation:

$$POS_P = \sum_{V_j \in Out(V_i)} \left( \frac{1}{|V|} + \frac{1}{|V|} POS_P(V_j) \right)$$

A counterpart positional weakness function may also be defined as:

$$POS_W = \sum_{V_j \in In(V_i)} \left( \frac{1}{|V|} + \frac{1}{|V|} POS_W(V_j) \right).$$

The HITS algorithm, the positional power function, and/or the positional weakness function may be used to rank (at 220) the graph nodes.

In another alternative embodiment, Google's PageRank may be used to rank (at 220) the graph nodes. PageRank is perhaps one of the most popular graph-based ranking algorithms and was designed as a method for Web link analysis. Unlike other ranking algorithms, PageRank integrates the impact of both incoming and outgoing links into one single model, and therefore it produces only one set of scores:

$$PR(V_i) = (1-d) + d * \sum_{V_j \in In(V_i)} \frac{PR(V_j)}{|Out(V_j)|},$$

The parameter d in this equation is a parameter that can be set to any number between 0 and 1. The damping factor d has the role of integrating into the model the probability of jumping from a given vertex to another random vertex in the graph. In the context of Web surfing, the PageRank graph-based ranking algorithm implements the "random surfer model," in which a user clicks on links at random with a probability d, and jumps to a completely new page with probability 1−d. A value of 0 for the factor d means that the ranking of a vertex does not depend at all on its outgoing links, while a value of 1 indicates that the score is determined exclusively by the links with neighboring vertices. In one embodiment, the factor d may be set at 0.85.

These ranking algorithms are solved recursively to rank (at 220) the graph nodes. For example, arbitrary values may be assigned to each node in the graph and the computation may iterate until convergence below a given threshold is achieved. The ranking algorithm can be also stopped after a fixed number of iterations. After running the algorithm, a score is associated with each vertex, which represents the "importance" or "power" of that vertex within the graph. The final values are not generally affected by the choice of the initial value. However, the number of iterations to convergence may be different for different choices of initial values.

Graph-based ranking algorithms, such as Kleinberg's HITS algorithm, the positional power function, or Google's PageRank, have been traditionally and successfully used in citation analysis, social networks, and the analysis of the link-structure of the World Wide Web. These algorithms are key elements of a recent paradigm-shift in the field of Web search technology that was, at least in part, triggered by the widespread adoption of Web page ranking mechanisms that rely on the collective knowledge of Web architects rather than individual content analysis of Web pages. However, other graph-based ranking algorithms may be used to rank (at 220) the graph nodes.

Figure 3A:
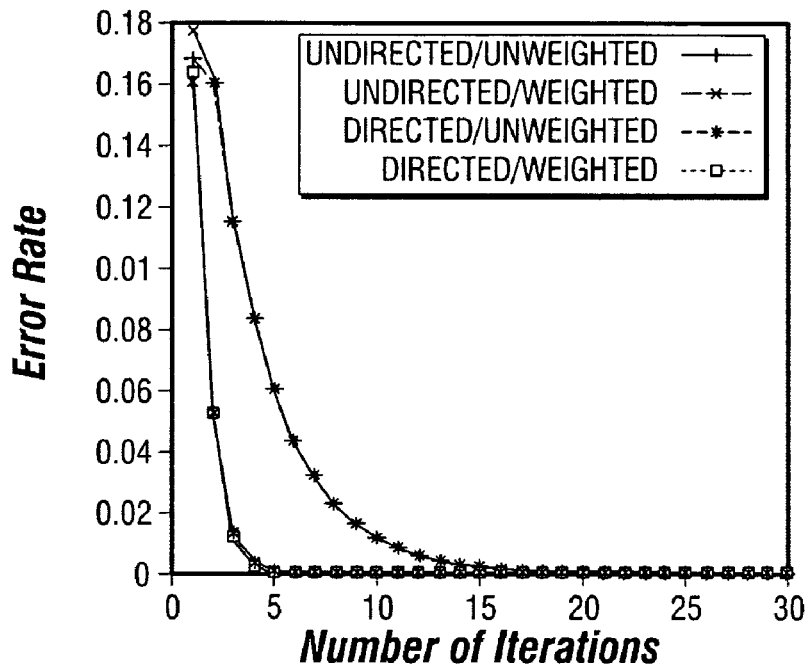
FIG. 3A plots convergence curves for a randomly generated graph with 250 vertices and 250 edges for a convergence threshold of 0.0001, in accordance with the present invention.
Figure 3B:
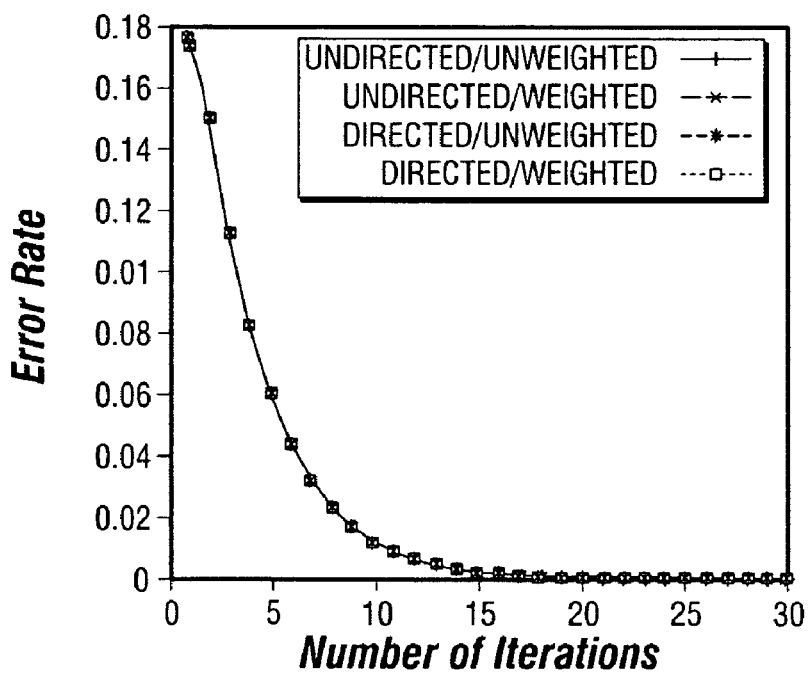
FIG. 3B plots convergence curves for randomly generated directed and undirected graphs with 250 vertices and 2500 graph edges, in accordance with the present invention.

In one alternative embodiment, recursive graph-based ranking algorithms can be also applied to rank (at 220) graph nodes in undirected graphs, in which case the out-degree of a vertex is equal to the in-degree of the vertex or graph node. For loosely connected graphs, with the number of graph edges proportional with the number of vertices or graph nodes, undirected graphs tend to have more gradual convergence curves. FIG. 3A plots convergence curves for a randomly generated graph with 250 vertices and 250 edges, for a convergence threshold of 0.0001, using a PageRank algorithm. As the connectivity of the graph increases (i.e. larger number of graph edges), convergence is usually achieved after fewer iterations. FIG. 3B plots convergence curves for randomly generated directed and undirected graphs with 250 vertices and 2500 graph edges. The convergence curves for directed and undirected graphs practically overlap.

In another alternative embodiment, a weighted graph may be used to rank (at 220) the graph nodes. In the context of Web surfing or citation analysis, it is unusual for a vertex to include multiple or partial links to another vertex, and hence the original definition for graph-based ranking algorithms assumed unweighted graphs. However, graphs built from natural language texts may include multiple or partial links between text units (i.e. vertices and/or graph nodes of the graph) that are extracted from text. It may be therefore useful to indicate and incorporate into the model the "strength" of the connection between two vertices $V_i$ and $V_j$ as a weight $W_{ij}$ added to the corresponding graph edge that connects the two vertices or graph nodes.

In one embodiment, the graph-based ranking algorithm may use formulae for graph-based ranking that take into account edge weights when computing the score associated with a vertex or graph node in the graph. Notice that similar formulae can be defined to integrate vertex weights. For example, the HITS algorithm may be modified to include weights as follows:

$$HITS_A^W(V_i) = \sum_{V_j \in In(V_i)} w_{ji} HITS_H^W(V_j)$$

$$HITS_H^W(V_i) = \sum_{V_j \in Out(V_i)} w_{ij} HITS_A^W(V_j).$$

where $w_{ij}$ are the weights. For another example, the positional power function and the counterpart positional weakness function may be modified to include weights as follows:

$$POS_P^W = \sum_{V_j \in Out(V_i)} \left( \frac{1}{|V|} + \frac{1}{|V|} w_{ij} POS_P(V_j) \right)$$

$$POS_W^W = \sum_{V_j \in In(V_i)} \left( \frac{1}{|V|} + \frac{1}{|V|} w_{ji} POS_W(V_j) \right).$$

For yet another example, the PageRank algorithm may be modified to include weights as follows:

$$PR^W(V_i) = (1-d) + d * \sum_{V_j \in In(V_i)} w_{ji} \frac{PR^W(V_j)}{|Out(V_j)|}.$$

FIGS. 3A and 3B also plot convergence curves for a graph with random weights in the interval 0-10 added to the edges. While the final vertex scores (and therefore rankings) for weighted graphs may differ significantly as compared to their unweighted alternatives, the number of iterations to convergence and the shape of the convergence curves may be almost identical for weighted and unweighted graphs.

The method 200 may be implemented in a variety of natural language processing tasks involving ranking of text units. Embodiments of three natural language processing tasks that may implement embodiments of the method 200 are described below. The first example illustrates one embodiment of an unsupervised method for word sense disambiguation of all words in open text. The second example illustrates one embodiment of a keyword extraction task that includes selecting keyphrases representative of a given text. The third example illustrates one embodiment of a sentence extraction task, which may include identifying one or more "most important" sentences in a text. The identified sentences can be used to build extractive summaries.

Figure 4:
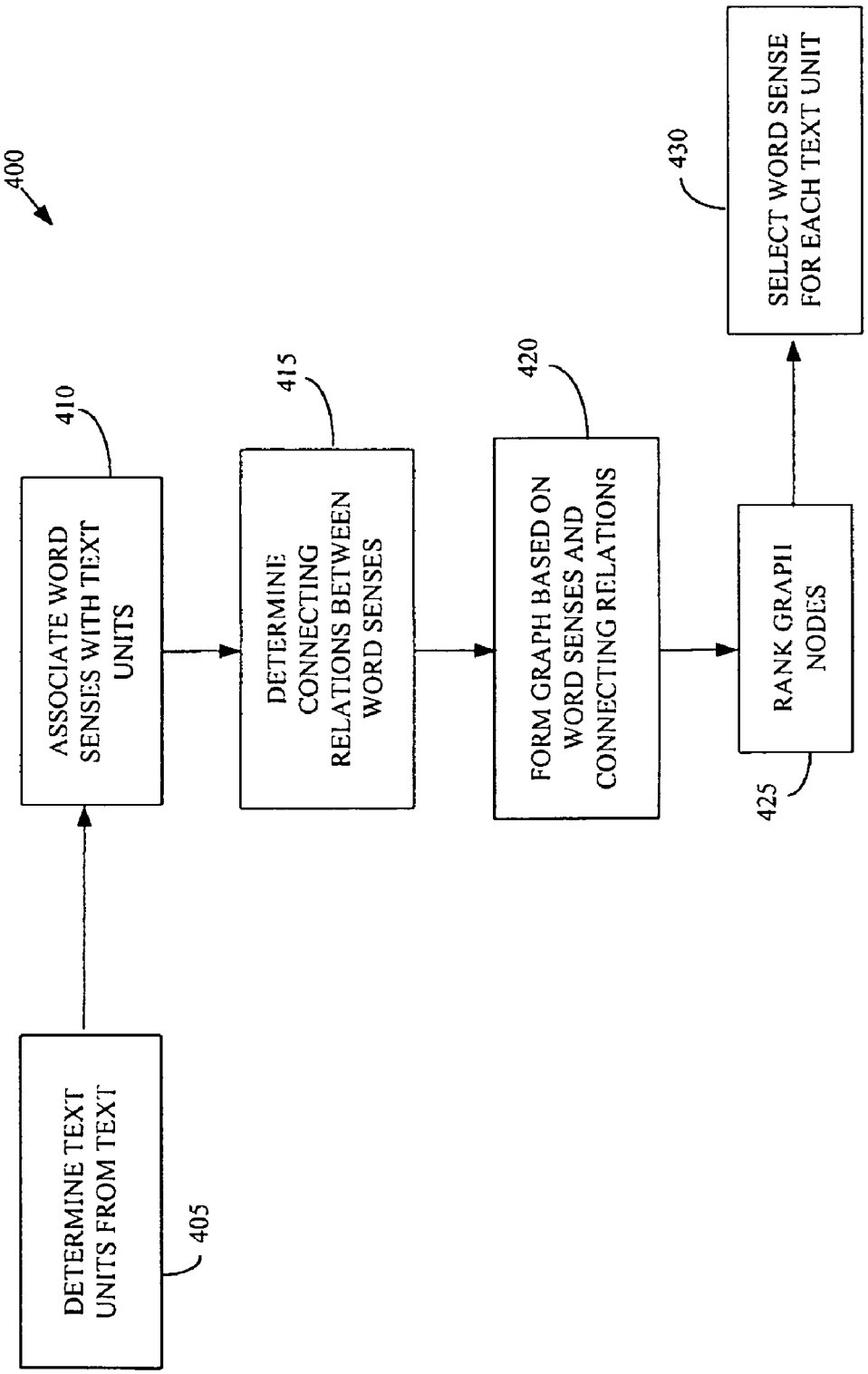
FIG. 4 conceptually illustrates a method of word sense disambiguation of words in an open text, in accordance with the present invention.

FIG. 4 conceptually illustrates a method 400 of word sense disambiguation of words in an open text. In the illustrated embodiment, text units are determined (at 405) from a natural language text. For example, input to the method 400 may consist of raw text and the method 400 may determine (at 405) an output that includes a text with word meaning annotations for all open-class words. Determining (at 405) the text units may include eliminating SGML tags, tokenizing the text, assigning part of speech tags using a Brill tagger, and identifying named entities are identified using Minipar. To identify collocations, sequences of words that form compound concepts defined in WordNet may be identified. In one embodiment, words previously assigned with a named entity tag and modal/auxiliary verbs are not considered.

The text units are associated (at 410) with one or more word senses. In one embodiment, each text units is associated (at 410) with one or more word senses using a lexical knowledge base. For example, WordNet is a lexical knowledge base for English that defines words, meanings, and relations between them. The basic unit in WordNet is a synset, which is a set of synonym words or word phrases, and represents a concept. However, persons of ordinary skill in the art having benefit of the present disclosure should appreciate that the present invention is not limited to WordNet. In alternative embodiments, any desirable technique for associating (at 410) text units with one or more word senses, including other lexical knowledge bases, dictionaries, thesauruses, and the like, may be used.

One or more connecting relations between the word senses are determined (at 415). In one embodiment, the connecting relations are determined (at 415) using a lexical knowledge base. For example, WordNet defines several semantic relations between synsets, including IS-A relations (hypernym/hyponym), PART-OF relations (meronym/holonym), entailment, attribute-of, and others. WordNet encodes a set of basic semantic relations, including hypernymy, hyponymy, meronymy, holonymy, entailment, causality, attribute, pertainimy. WordNet 2.0 has also introduced nominalizations, which link verbs and nouns pertaining to the same semantic class, and domain links, which are a first step toward the classification of synsets based on the relevant "ontology" associated with a given synset. While the domain relations/links usually add a small number of links, their use may help focusing on a dominant field, which has been observed to help the disambiguation process.

While the link graph built using relations between synsets in a text implements the intuition that highly interrelated word senses are more likely to be the right ones for ambiguous words occurring in the document, the link graph may, in some embodiments, be extended with semantic information gleaned through several inferential layers. In one embodiment, two or more basic WordNet relations may be combined together to form a new relation. For example, hypernymy and hyponymy may be combined to obtain a coordinate relation that identifies synsets that share the same hypernym. For example, dog#1 and wolf∩1 are coordinates, since they share the same hypernym canine#1. In another embodiment, a composite relation xlink may be defined that integrates all the basic relations (nominalizations and domain links included) and the coordinate relation. Two synsets are connected by an xlink relation if any WordNet-defined relation or a coordinate relation can be identified between them.

In other embodiments, additional synset relations can be introduced via WordNet glosses, by defining a link between all synsets pertaining to all open-class words in a gloss, and the synset that the gloss defines (since words in glosses are not disambiguated, all possible word meanings are considered). Notice that this relation is across parts of speech, and can link, e.g., verb and noun synsets together. Alternatively, links may be added between co-occurring synsets. The addition of a co-occurrence link is controlled by a distance between the synset occurrences (usually a small value, e.g. 3 or 4). Similar to the previous relation, there is no constraint as to the parts of speech of the synsets that can be linked by co-occurrence relations.

The semantic relations defined by WordNet may be used to determine (at 415) one or more connecting relations between word senses of the text units. However, persons of ordinary skill in the art having benefit of the present disclosure should appreciate that, in alternative embodiments, any desirable technique for determining (at 415) connecting relations between one or more word senses, including other lexical knowledge bases, dictionaries, thesauruses, and the like, may be used. Relations can be also combined, for example, connecting relations may be defined to account for both the ISA and the PART-OF relations between the vertices or graph nodes in the graph.

A graph is then formed (at 420) based on the word senses and connecting relations. In one embodiment, the word senses and connecting relations determined (at 410 and 415) using WordNet may be represented as a graph using an instance-centric data representation, which defines synsets as vertices or graph nodes, and relations or sets of relations as graph edges. The graph can be constructed as an undirected graph, with no orientation defined for the graph edges, or as a directed graph, in which case a direction is arbitrarily established for each relation associated with a graph edge (e.g. hyponym~hypernym). Given a subset of the WordNet synsets, as identified in a given text or by other selectional criteria, and given a semantic relation, a graph is constructed by identifying all the synsets (vertices or graph nodes) in the given subset that can be linked by the given relation (graph edges).

In one embodiment, no a-priori semantic information is available for the words in the text, and so every possible sense of a word is assumed to be a potentially correct sense, and therefore all senses for all words may be included in the initial search set. The synsets pertaining to all word senses form therefore the vertices or graph nodes of the graph. The graph edges between the graph nodes are drawn using synset relations available in WordNet, either explicitly encoded in the network, or derived by various techniques.

In some embodiments, not all WordNet arcs may be suitable as they sometimes identify competing word senses that tend to share targets of incoming or outgoing links. Two synsets may be called colexical if they represent two senses of the same word—that is, if they share one identical lexical unit. In one embodiment, for a given word or word phrase, colexical synsets will be listed as competing senses, from which a given disambiguation algorithm should select one. In one embodiment, colexical synsets should not be linked together to ensure that colexical synsets do not "contaminate" each other's values. Thus, colexical synsets compete through disjoint sets of links. This means that relations between synsets pertaining to various senses of the same word or word phrase may not be added to the graph. For example, the verb travel has six senses defined in WordNet, with senses 2 and 3 linked by an ISA relation (travel#2 ISA travel#3). Since the synsets pertaining to these two senses are colexical (they share the lexical unit travel), this ISA link is not added to the text graph.

One or more graph nodes are ranked (at 425) based upon the graph using a graph-based ranking algorithm such as described above. In one embodiment, an initial small value is assigned to each vertex or graph node in the graph. For example, vertices or graph nodes are initially assigned a value of 1. The graph-based ranking algorithm is then iterated until it converges. In one embodiment, the graph-based ranking algorithm converges after approximately 25-30 iterations. The final values (or scores) obtained after convergence are not generally affected by the choice of the initial value, although the number of iterations to convergence may be different for different choices of the initial value.

A word sense for each text unit is then selected (at 430) based upon the graph node rankings or scores. In one embodiment, the word sense for each text unit is selected (at 430) by assuming that the word sense with the highest score uniquely identifies each ambiguous word in the text. If none of the synsets corresponding to the meanings of a word could be connected with other synsets in the graph using the given connecting relations, the word may be assigned with a random sense (when the WordNet sense order is not considered), or with the first sense in WordNet (when a sense order is available).

In one embodiment, the algorithm can be run on the entire text at once, in which case the resulting graph is fairly large—usually more than two thousand vertices—and has high connectivity. Running the algorithm on the entire text may result in richer synset graphs and help ensure that most of the words are assigned a meaning using the TextRank sense disambiguation algorithm. Alternatively, it can be run on smaller sections of the text, and in this case the graphs have lower number of vertices and lower connectivity.

The graph-based ranking algorithms used to rank (at 425) graph nodes and select (at 430) word senses may, in some alternative embodiments, the combined with other algorithms. The combination algorithms may provide better word disambiguation then either algorithm could provide when operating independently, as will be discussed in detail below. In one embodiment, the graph-based ranking algorithms may be combined with a Lesk algorithm. The combined algorithm may then consist of providing a default ordering using a Lesk algorithm, possibly after shuffling WordNet senses to remove sense frequency bias, and then applying the graph-based ranking algorithm, which will eventually reorder the senses. With this approach, word senses that receive similar scores from the graph-based ranking algorithm may keep their Lesk ordering. However, word senses that receive a different score from the graph-based ranking algorithm may receive scores that override their Lesk ordering.

In one alternative embodiment, the graph-based ranking algorithms may be combined with a most frequent sense algorithm. For example, WordNet frequency ordering may be introduced by removing the random permutation of senses. A formula may then be used to combine the graph-based rankings and actual WordNet sense frequency information. For example, the following formula that prioritizes the first sense may provide better results than a simple product of the two ranks:

$$\text{Rank} = \begin{cases} 4 \times FR \times PR & \text{if } N = 1 \\ FR \times PR & \text{if } N > 1 \end{cases}$$

where FR represents the WordNet sense frequency, PR is the rank or score provided by the graph-based ranking algorithm, N is the position in the frequency ordered synset list, and Rank is the combined rank.

Accuracy of embodiments of the word sense disambiguation algorithms described above may be evaluated using a benchmark of sense-annotated texts, in which each open-class word is mapped to a meaning selected by a lexicographer as being the most appropriate one in the context of a sentence. For example, a subset of the SemCor texts—five randomly selected files covering different topics in news, sports, entertainment, law, and debates—and a data set provided for the English all words task during SENSEVAL-2 may be used. The average size of a file is 600-800 open class words. Two sets of evaluations are run on each set. A first set consists of a basic "uninformed" version of the knowledge-based algorithms, where the sense ordering provided by the dictionary is not taken into account at any point. A second set of experiments consisting of "informed" disambiguation algorithms, which incorporate the sense order rendered by the dictionary.

In the uninformed version, word senses are ordered in WordNet by decreasing frequency of their occurrence in large sense annotated data. In the illustrated embodiment, this ordering is removed by applying a random permutation of the senses with uniform distribution. This randomization step may remove any eventual bias introduced by the sense ordering and it enables us to evaluate the impact of the disambiguation algorithm when no information about sense frequency is available.

The following dictionary-based algorithms are evaluated and compared: TextRank (e.g. the algorithm illustrated in FIG. 2), Lesk, combined TextRank-Lesk, and the random baseline. The TextRank-based algorithm introduced here selects the most likely sense of a word based on the TextRank score assigned to the synsets corresponding to the given word within the text graph, as described above. The results reported here were obtained with the xlink relation, which was found to perform best as compared to other semantic relations. A Lesk algorithm, which decides on the correct sense of a word based on the highest overlap between the dictionary sense definitions and the context where the word occurs, is also tested. The TextRank and Lesk algorithms are also combined into one hybrid algorithm. First, we order the senses based on the score assigned by the Lesk algorithm, and then apply TextRank on this reordered set of senses. A simple sense annotation algorithm, which assigns a random sense to each word in the text and which represents a baseline for this set of "uninformed" word sense disambiguation algorithms, is also tested.

Table 1 lists the disambiguation precision obtained by each of these algorithms on the evaluation benchmark. On average, TextRank gives an accuracy of 47.27%, which brings a significant 7.7% error reduction with respect to the Lesk algorithm and 19.0% error reduction over the random baseline. The best performance is achieved by a combined TextRank and Lesk algorithm: 51.16% accuracy, which brings a 28.5% error reduction with respect to the random baseline. Notice that all these algorithms rely exclusively on information drawn from dictionaries, and do not require any information on sense frequency, which makes them highly portable to other languages.

TABLE 1

|  | Size (words) | Random | Lesk | TextRank | TextRank + Lesk |
|---|---|---|---|---|---|
| SemCor | | | | | |
| Law | 825 | 37.12% | 39.62% | 46.42% | 49.36% |
| Sports | 808 | 29.95 | 33.00 | 40.59 | 46.18 |
| Education | 898 | 37.63 | 41.33 | 46.88 | 52.00 |
| Debates | 799 | 40.17 | 42.38 | 47.80 | 50.52 |
| Entertainment | 802 | 39.27 | 43.05 | 43.89 | 49.31 |
| Average | 826 | 36.82 | 39.87 | 45.11 | 49.47 |
| Senseval-2 | | | | | |
| D00 | 471 | 28.97 | 43.94 | 43.94 | 47.77 |
| D01 | 784 | 45.47 | 52.65 | 54.46 | 57.39 |
| D02 | 514 | 39.24 | 49.61 | 54.28 | 56.42 |
| Average | 590 | 37.89 | 48.73 | 50.89 | 53.86 |
| Average (All) | 740 | 37.22 | 43.19 | 47.27 | 51.16 |

In the informed version, the disambiguation algorithms incorporate the sense order provided by WordNet. Notice that this class of algorithms is still unsupervised, in that no annotated data is required, and only information provided by the dictionary is used. Four different algorithms are evaluated: TextRank, Lesk, combined TextRank-Lesk, and a baseline consisting of assigning by default the most frequent sense. The Lesk algorithm is applied on an ordered set of senses. This means that words that have two or more senses with a similar score identified by Lesk, will keep the WordNet sense ordering. A hybrid algorithm that combines TextRank, Lesk, and the dictionary sense order is applied on the ordered set of senses. A simple "informed" sense annotation algorithm, which assigns by default the most frequent sense to each word in the text (i.e. sense number one in WordNet) can be also applied.

TABLE 2

|  | Size (words) | Most frequent sense | Lesk | TextRank | TextRank + Lesk |
|---|---|---|---|---|---|
| SemCor | | | | | |
| Law | 825 | 69.09% | 72.65% | 73.21% | 73.97% |
| Sports | 808 | 57.30 | 64.21 | 68.31 | 68.31 |
| Education | 898 | 64.03 | 69.33 | 71.65 | 71.53 |
| Debates | 799 | 66.33 | 70.07 | 71.14 | 71.67 |
| Entertainment | 802 | 59.72 | 64.98 | 66.02 | 66.16 |
| Average | 826 | 63.24 | 68.24 | 70.06 | 70.32 |
| Senseval-2 | | | | | |
| D00 | 471 | 51.70 | 53.07 | 58.17 | 57.74 |
| D01 | 784 | 60.80 | 64.28 | 67.85 | 68.11 |
| D02 | 514 | 55.97 | 62.84 | 63.81 | 64.39 |
| Average | 590 | 56.15 | 60.06 | 63.27 | 63.41 |
| Average (All) | 740 | 60.58 | 65.17 | 67.51 | 67.72 |

Table 2 lists the accuracy obtained by each of these informed algorithms on the same benchmark as was used to produce Table 1. Again, the TextRank algorithm exceeds the other knowledge-based algorithms by a significant margin: it brings an error rate reduction of 21.3% with respect to the most frequent sense baseline, and a 7.2% error reduction over the Lesk algorithm. Interestingly, combining TextRank and Lesk under this informed setting does not bring any significant improvements over the individual algorithms: 67.72% obtained by the combined algorithm compared with 67.51% obtained with TextRank only.

The above results indicate that for fully unsupervised algorithms with no a-priori knowledge about sense order, or informed methods where the sense order rendered by the dictionary is taken into account, the TextRank word sense disambiguation algorithm, such as described in FIG. 4, exceeds the baseline by a large margin, and always outperforms the Lesk algorithm. Moreover, a hybrid algorithm that combines the TextRank and Lesk methods into one single algorithm is found to improve over the individual algorithms in the first setting, but brings no significant changes when the sense frequency is also integrated into the disambiguation algorithm. This may be explained by the fact that the additional knowledge element introduced by the sense order in WordNet increases the redundancy of information in these two algorithms to the point where their combination cannot improve over the individual algorithms.

Figure 5:
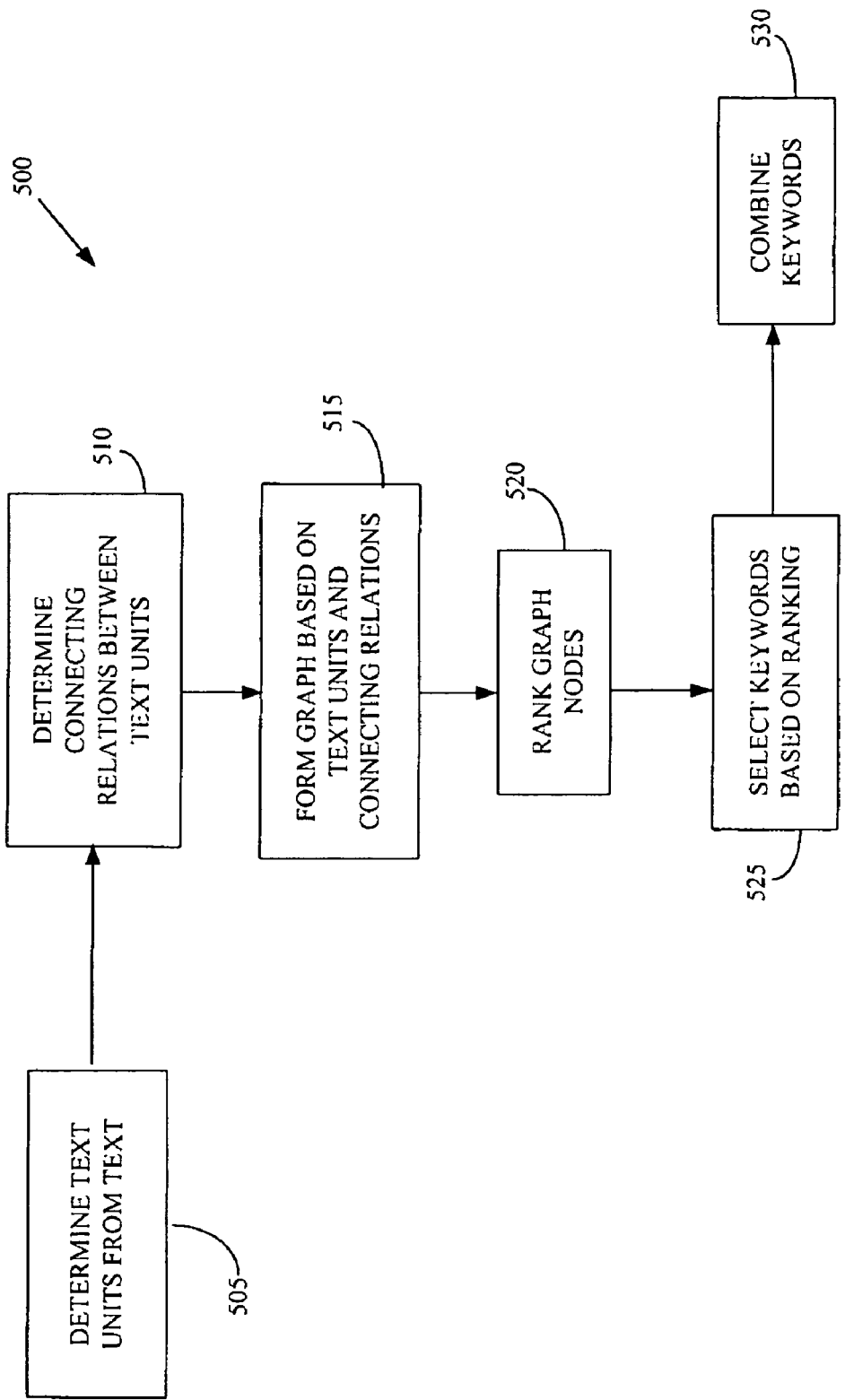
FIG. 5 conceptually illustrates one exemplary embodiment of a method for keyword extraction, in accordance with the present invention.

FIG. 5 conceptually illustrates one exemplary embodiment of a method 500 for keyword extraction. In the illustrated embodiment, text units are determined (at 505) from a natural language text. For example, text units may be determined (at 505) from the following natural language text:

Compatibility of systems of linear constraints over the set of natural numbers. Criteria of compatibility of a system of linear Diophantine equations, strict inequations, and nonstrict inequations are considered. Upper bounds for components of a minimal set of solutions and algorithms of construction of minimal generating sets of solutions for all types of systems are given. These criteria and the corresponding algorithms for constructing a minimal supporting set of solutions can be used in solving all the considered types systems and systems of mixed types.

In one embodiment, the natural language text is tokenized and annotated with part of speech tags—a preprocessing step that may be required to enable the application of syntactic filters. Alternative embodiments may consider alternative filters. In the illustrated embodiment, only single words are considered as candidates for addition to the graph, at least in part to avoid excessive growth of the graph size by adding all possible combinations of sequences consisting of more than one lexical unit (ngrams). Multi-word keywords may be reconstructed in the post-processing phase.

One or more connecting relations between the text units are determined (at 510). The text units to be ranked may be sequences of one or more lexical units extracted from the text. Any relation that can be defined between two lexical units is a potentially useful connecting relation that can be added between two such lexical units. In the illustrated embodiment, a co-occurrence relation is used as a connecting relation. The co-occurrence relation may be controlled by the distance between word occurrences. For example, two vertices may be connected (at 510) if their corresponding lexical units co-occur within a window of maximum N words, where N can be set anywhere from 2 to 10 words. A graph is formed (at 515) based on the text units and the connecting relations.

Figure 6:
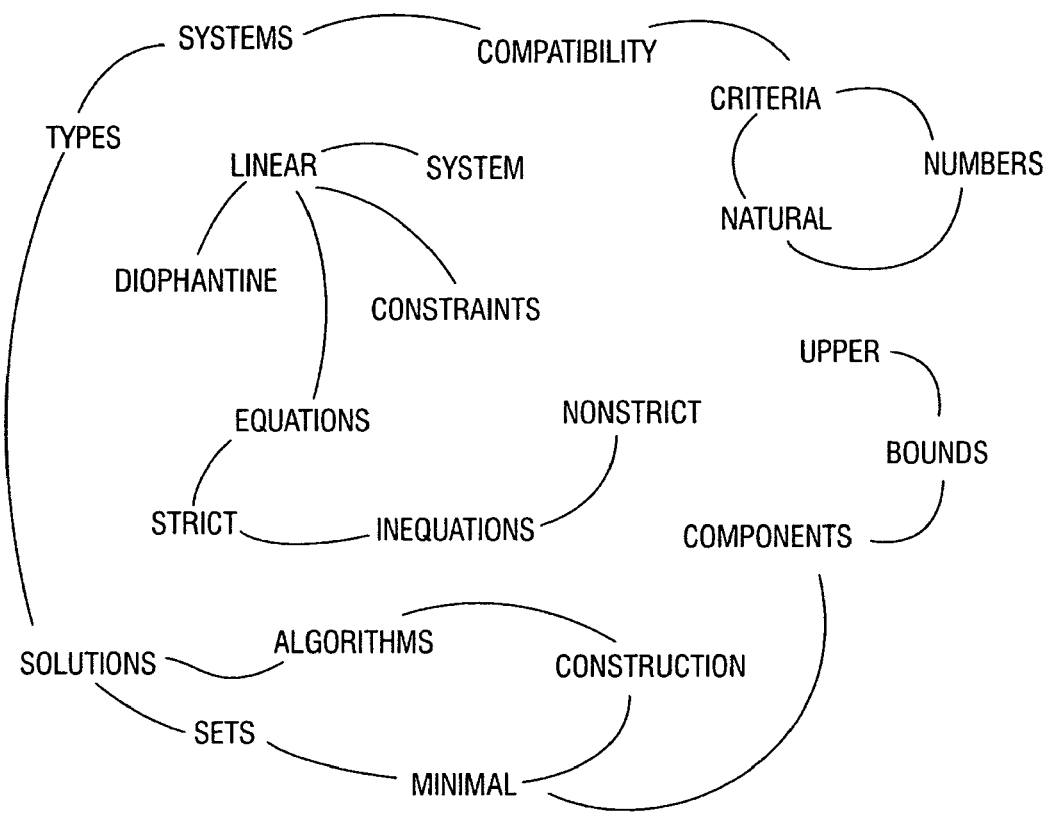
FIG. 6 conceptually illustrates a graph that may be formed based upon a natural language text, in accordance with the present invention.

FIG. 6 conceptually illustrates a graph 600 that may be formed (at 515) based upon the example natural language text shown above. The vertices or graph nodes of the graph 600 are occupied by various lexical units identified in the natural language text and the lines or graph edges are formed based upon a co-occurrence relation. The vertices added to the graph 600 can be restricted with syntactic filters, which select only lexical units of a certain part of speech. One can, for instance, consider only nouns and verbs for addition to the graph, and consequently draw potential edges based only on relations that can be established between nouns and verbs. However, persons of ordinary skill in the art having benefit of the present disclosure should appreciate that any desirable syntactic or lexical filters may be used including, but not limited to, all open class words, nouns and verbs only, nouns and adjectives only, and the like.

For the example shown in FIG. 6, the lexical units found to have higher "importance" by the TextRank algorithm are (with the TextRank score indicated in parenthesis): numbers (1.46), in equations (1.45), linear (1.29), diophantine (1.28), upper (0.99), bounds (0.99), strict (0.77). Notice that this ranking is different than the one rendered by simple word frequencies. For the same text, a frequency approach provides the following top-ranked lexical units: systems (4), types (3), solutions (3), minimal (3), linear (2), in equations (2), algorithms (2). All other lexical units have a frequency of 1, and therefore are not ranked this example, but only listed.

Referring back to FIG. 5, the graph nodes may be ranked (at 520) based upon the graph. In one embodiment, after the graph is constructed (undirected unweighted graph), a score associated with each vertex or graph node is set to an initial value of 1, and a ranking algorithm such as described above is run on the graph for several iterations until it converges—usually for 20-30 iterations, at a threshold of 0.0001. One or more keywords are selected (at 525) based upon the ranking. In one embodiment, once a final score is obtained for each vertex in the graph, vertices or graph nodes are sorted in reversed order of their score, and the top T vertices in the ranking are retained for post-processing. While T may be set to any fixed value, usually ranging from 5 to 20 keywords. For example, the number of keywords selected (at 525) may be limited to five. Alternatively, the number of keywords may be limited to a value that is determined based on the size of the text. For example, number of keywords selected (at 525) from relatively short abstracts may be set to a third of the number of vertices in the graph.

In one embodiment, individual keywords may be combined (at 530) to form multi-word keywords. For example, during post-processing, all lexical units selected as potential keywords by the TextRank algorithm may be marked in the text, and sequences of adjacent keywords may be collapsed into a multi-word keyword. For instance, in the text Matlab code for plotting ambiguity functions, if both Matlab and code are selected as potential keywords by TextRank, they may be collapsed into one single keyword Matlab code since they are adjacent in the text.

Performance of embodiments of the method 500 may be evaluated and applying the method 500 to a collection of 500 abstracts from the Inspec database, and the corresponding manually assigned keywords. The Inspec abstracts are from journal papers from Computer Science and Information. Each abstract comes with two sets of keywords assigned by professional indexers: controlled keywords, restricted to a given thesaurus, and uncontrolled keywords, freely assigned by the indexers. The results are evaluated using precision, recall, and F-measure. Notice that the maximum recall that can be achieved on this collection is less than 100%, since indexers were not limited to keyword extraction—as our system is—but they were also allowed to perform keyword generation, which eventually results in keywords that do not explicitly appear in the text.

For comparison purposes, results of a Hulth keyword extraction system are presented. The Hulth keyword extraction system consists of a supervised learning scheme that attempts to learn how to best extract keywords from a document, by looking at a set of four features that are determined for each "candidate" keyword: (1) within-document frequency, (2) collection frequency, (3) relative position of the first occurrence, (4) sequence of part of speech tags. These features are extracted from both training and test data for all "candidate" keywords, where a candidate keyword can be: Ngrams (unigrams, bigrams, or trigrams extracted from the abstracts), NP-chunks (noun phrases), and/or patterns (a set of part of speech patterns detected from the keywords attached to the training abstracts). The learning system is a rule induction system with bagging. The performance of the Hulth keyword extraction system is compared to the keyword extraction system described herein, i.e. the TextRank algorithm with a co-occurrence window-size set to two, three, five, or ten words.

Table 3 lists the results obtained with TextRank and the best results reported for the Hulth keyword extraction system. For each technique, Table 3 lists the total number of keywords assigned, the mean number of keywords per abstract, the total number of correct keywords, as evaluated against the set of keywords assigned by professional indexers, and the mean number of correct keywords. Table 3 also lists precision, recall, and F-measure.

The TextRank algorithm, such as described with reference to FIG. 5, achieves the highest precision and F—measure across all systems, although the recall is not as high as in supervised methods—possibly due the limitation imposed on the number of keywords selected, which is not made in the supervised system. A larger window does not seem to help—on the contrary, the larger the window, the lower the precision, probably explained by the fact that a relation between words that are further apart is not strong enough to define a connection in the text graph.

Experiments were performed with various syntactic filters, including: all open class words, nouns and adjectives, and nouns only. The best performance was achieved with the filter that selects nouns and adjectives only. Experiments have also been performed using a setting where no part of speech information was added to the text, and all words—except a predefined list of stopwords—were added to the graph. The results with this setting were significantly lower than the systems that consider part of speech information, which corroborates with previous observations that linguistic information helps the Hulth keyword extraction system. Experiments were also performed with directed graphs, where a direction was set following the natural flow of the text, e.g. one candidate keyword "recommends" (and therefore has a directed arc to) the candidate keyword that follows in the text, keeping the restraint imposed by the co-occurrence relation. The reversed direction was also tried, where a lexical unit points to a previous token in the text.

Table 3 also includes results obtained with directed graphs for a co-occurrence window of 2. Regardless of the direction chosen for the arcs, results obtained with directed graphs are worse than results obtained with undirected graphs, which suggests that despite a natural flow in running text, there is no natural "direction" that can be established between co-occurring words. Overall, the TextRank system leads to an F-measure higher than any of the previously proposed systems. Notice that TextRank is completely unsupervised, and unlike other supervised systems, it relies exclusively on information drawn from the text itself, which makes it easily portable to other text collections, domains, and languages.

TABLE 3

| Method | Assigned Total | Assigned Mean | Correct Total | Correct Mean | Precision | Recall | F-measure |
|---|---|---|---|---|---|---|---|
| TextRank | | | | | | | |
| Undir, Window = 2 | 6784 | 13.7 | 2116 | 4.2 | 31.2 | 43.1 | 36.2 |
| Undirected, Window = 3 | 6715 | 13.4 | 1897 | 3.8 | 28.2 | 38.6 | 32.6 |
| Undirected, Window = 5 | 6558 | 13.1 | 1851 | 3.7 | 28.2 | 37.7 | 32.2 |
| Undirected, Window = 10 | 6570 | 13.1 | 1846 | 3.7 | 28.1 | 37.6 | 32.2 |
| Forward Directed Window = 2 | 6662 | 13.3 | 2081 | 4.1 | 31.2 | 42.3 | 35.9 |
| Backward Directed Window = 2 | 6636 | 13.3 | 2082 | 4.1 | 31.2 | 42.3 | 35.9 |
| Hulth | | | | | | | |
| Ngram w/tag | 7815 | 15.6 | 1973 | 3.9 | 25.2 | 51.7 | 33.9 |
| NP-chunks w/tag | 4788 | 9.6 | 1421 | 2.8 | 29.7 | 37.2 | 33.0 |
| Pattern w/tag | 7012 | 14.0 | 1523 | 3.1 | 21.7 | 39.9 | 28.1 |

Figure 7:
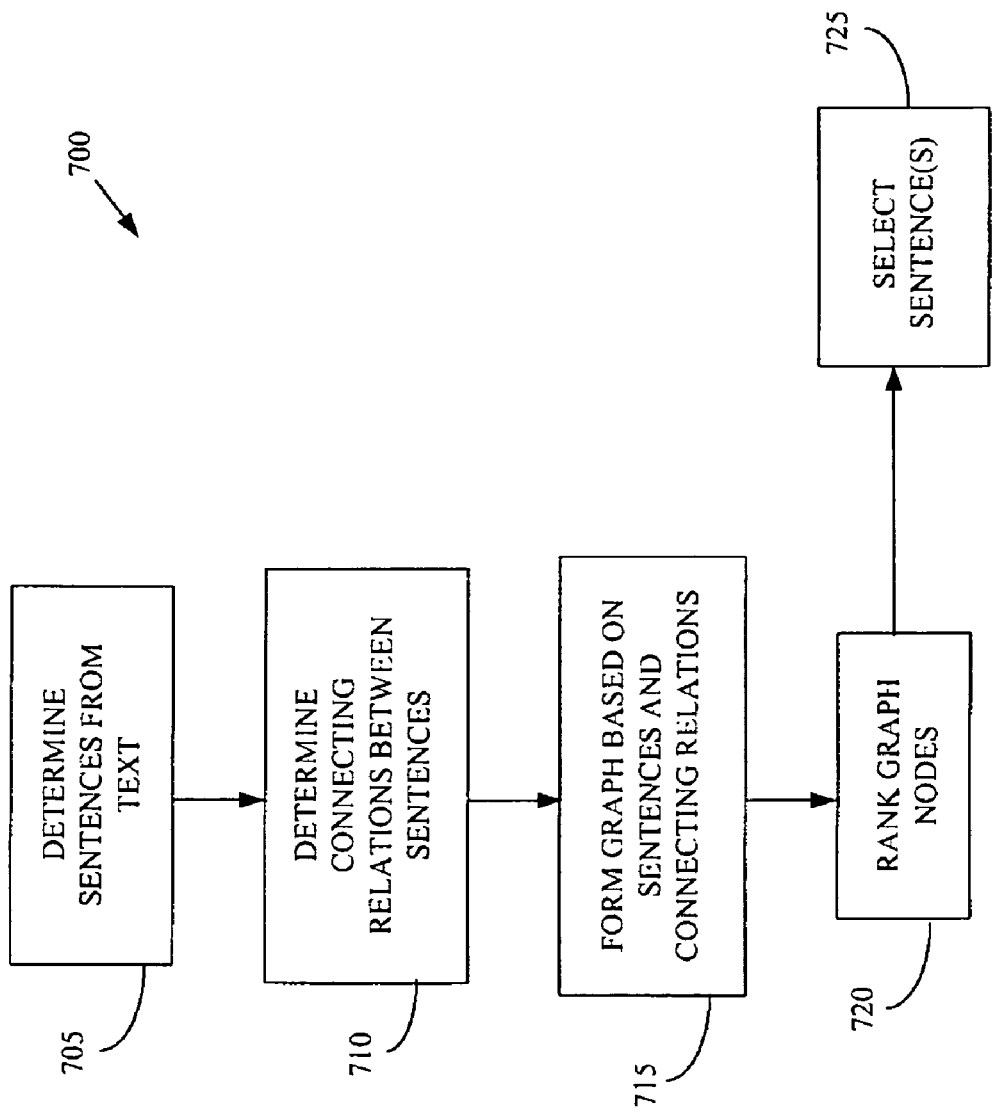
FIG. 7 conceptually illustrates one embodiment of a method of sentence extraction, in accordance with the present invention.

FIG. 7 conceptually illustrates one exemplary embodiment of a method 700 of sentence extraction. One or more sentences are determined (at 705) based upon the text, such as a natural language text. For example, the following sentences were determined (at 705) from the newspaper article about hurricane Gilbert:

3: hurricane Gilbert, 09-11.339

4: hurricane Gilbert, 0348

5: hurricane Gilbert heads toward Dominican coast

6: By Ruddy Gonzalez

7: Associated Press Writer

8: Santo Domingo, Dominican Republic (AP)

9: Hurricane Gilbert swept toward the Dominican Republic Sunday, and the civil defense alerted its heavily populated south coast to prepare for high winds, heavy rains, and high seas.

10: the storm was approaching from the southeast with sustained winds of 75 mph gusting to 92 mph.

11: "there is no need for alarm" Civil Defense Director Eugenio Cabral said in a television alert shortly after midnight Saturday.

12: Cabral said residents of the province Barahona of should closely follow Gilbert's movement.

13: An estimated 100,000 people live in the province, including 70,000 in the city of Barahona about 125 miles west of Santo Domingo.

14: Tropical storm Gilbert formed in the eastern Caribbean and strengthened into a hurricane Saturday night.

15: The National Hurricane Center in Miami reported its position at 2 a.m. Sunday at latitude 16.1 North, longitude 67.5 West, about 140 miles south of Ponce, Puerto Rico, and 200 miles southeast of Santo Domingo.

16: the National Whether Service in San Juan Puerto Rico said Gilbert was moving westward at 15 mph with a "broad area of cloudiness and heavy weather" rotating around the center of the storm.

17: The whether service issued a flash flood watch for Puerto Rico and the Virgin Islands until at least 6 p.m. Sunday.

18: Strong winds associated with the Gilbert brought coastal flooding, strong southeast winds, and up to 12 feet to Puerto Rico's south coast.

19: There were no reports on casualties.

20: San Juan, on the north coast, had heavy rains and gusts Saturday, but they subsided during the night.

21: one Saturday, hurricane Florence was downgraded to tropical storm, and its remnants pushed inland from the US Gulf Coast.

22: Residents returned home, happy to find little damage from 90 mph winds and sheets of rain.

23: Florence, the sixth named storm of the 1988 Atlantic storm season, was the second hurricane.

24: The first, Debbie, reached minimal hurricane strength briefly before hitting the Mexican coast last month.

One or more connecting relations are determined (at 710) between the sentences. In the illustrated embodiment, the connecting relations are determined (at 710) based upon a similarity relation, where "similarity" may be measured as a function of content overlap. Such a relation between two sentences can be seen as a process of "recommendation": a sentence that addresses certain concepts in a text, gives the reader a "recommendation" to refer to other sentences in the text that address the same concepts, and therefore a link can be drawn between any two such sentences that share common content. In various alternative embodiments, overlap of two sentences can be determined simply as the number of common tokens between the lexical representations of the two sentences, or it can be run through syntactic filters, which only count words of a certain syntactic category, e.g. all open class words, nouns and verbs, etc. Moreover, to avoid promoting long sentences, a normalization factor may be used in some embodiments. For example, the content overlap of two sentences may be divided by the length of each sentence. Formally, given two sentences $S_i$ and $S_j$, with a sentence being represented by the set of $N_i$ words that appear in the sentence: $S_i = W_{i1}, W_{i2}, \ldots, W_{iN}$, the similarity between the two sentences may be defined as:

$$\text{Similarity}(S_i, S_j) = \frac{|W_k \mid W_k \in S_i \ \& W_k \in S_j|}{\log(|S_i|) + \log(|S_j|)}$$

A graph is then formed (at 715) based on the sentences and the connecting relations. In the illustrated embodiment, the resulting graph is highly connected, with a weight associated with each edge, indicating the strength of the connections between various sentence pairs in the text. Thus, in one embodiment, the text may be represented as a weighted graph. In various alternative embodiments, the graph can be represented as: (a) simple undirected graph; (b) directed weighted graph with the orientation of edges set from a sentence to sentences that follow in the text (directed forward); or (c) directed weighted graph with the orientation of edges set from a sentence to previous sentences in the text (directed backward).

Graph nodes are then ranked (at 720) based upon the graph and one or more sentences are selected (at 725) based upon the ranking. In the illustrated embodiment, sentences are sorted in reversed order of their score or ranking after the ranking algorithm is run (at 720) on the graph and the top ranked sentences are selected (at 725) for inclusion in a summary.

Figure 8:
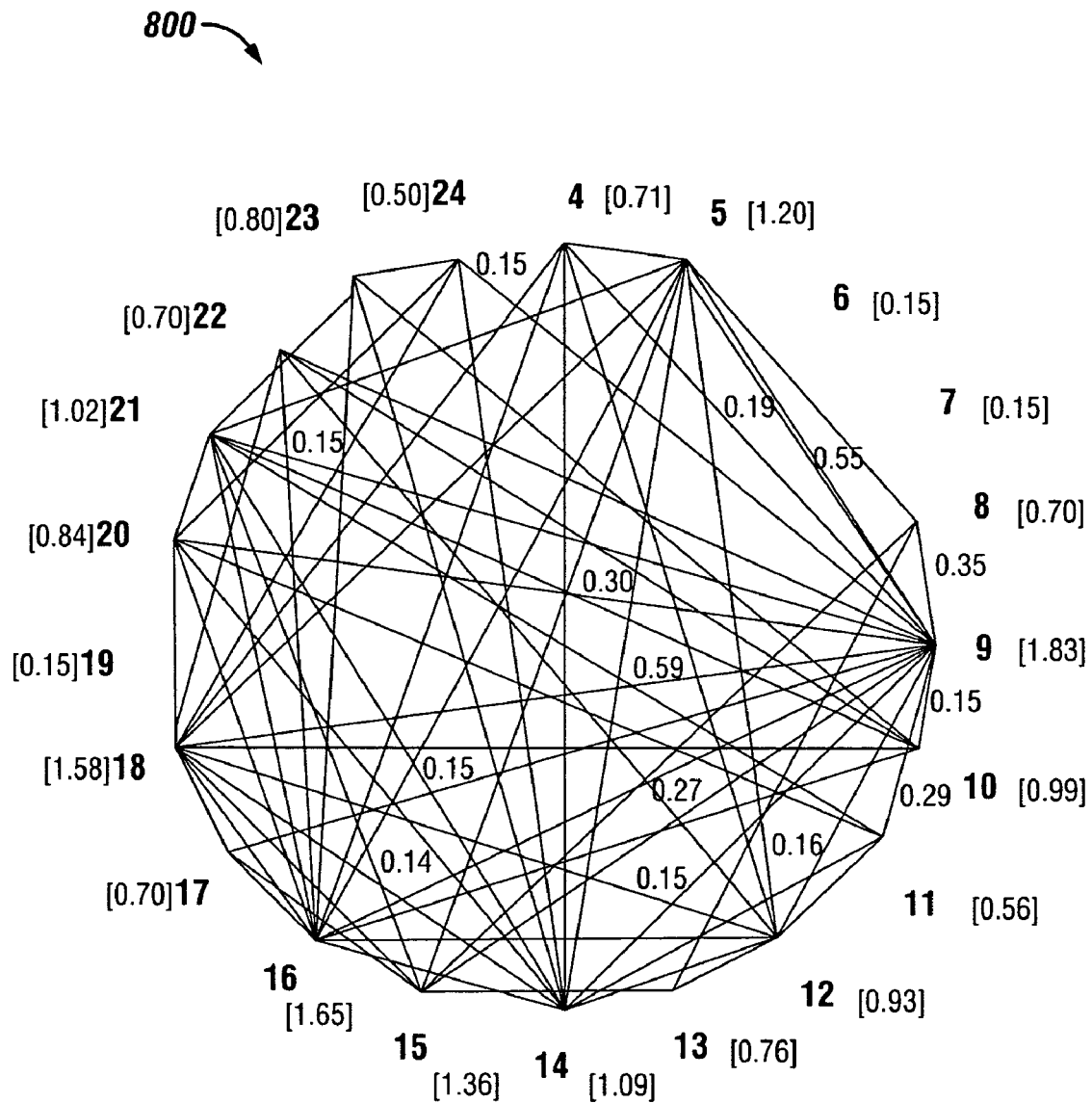
FIG. 8 shows a weighted graph that was formed using the sentences determined from a newspaper article.

FIG. 8 shows a weighted graph 800 that was formed using the sentences determined (at 705) from the newspaper article regarding hurricane Gilbert. FIG. 8 also shows sample weights attached to the edges connected to vertex 9, and the final score computed (at 720) for each vertex, using the PR formula, applied on an undirected graph. In the illustrated embodiment, weights are listed to the right or above the edge they correspond to. Similar weights may be computed for each edge in the graph, but are not displayed due to space restrictions. The sentences with the highest rank are selected (at 725) for inclusion in the abstract. For this sample article, the sentences with id-s 9, 15, 16, 18 are extracted, resulting in a summary of about 100 words. In the illustrated embodiment, the abstract formed by applying the method 700 to the newspaper article about hurricane Gilbert is:

Hurricane Gilbert swept toward the Dominican Republic Sunday and the civil defense alerted its heavily populated south coast to prepare for high winds, heavy rains, and high seas. The National Hurricane Center in Miami reported its position at 2 a.m. Sunday at latitude 16.1 North, longitude 67.5 West, about 140 miles south of Ponce Puerto Rico, and 200 miles southeast of Santo Domingo. The National Whether Service in San Juan Puerto Rico said Gilbert was moving westward at 15 mph with a "broad area of cloudiness and heavy weather" rotating around the center of the storm. Strong winds associated with Gilbert brought coastal flooding, strong southeast winds and up to 12 feet to Puerto Rico's south coast.

According to automatic evaluation measures, this abstract is ranked the second among summaries produced by 15 other systems.

The TextRank sentence extraction algorithm described above has been evaluated in the context of a single document summarization task, using 567 news articles provided during the Document Understanding Evaluations 2002. For each article, TextRank generates a 100-word summary, which is the same as the task undertaken by other systems that have participated in this single document summarization task. The evaluation uses a ROUGE evaluation toolkit, which is a method based on N-gram statistics and has been found to be highly correlated with human evaluations. Two manually produced reference summaries are provided and used in the evaluation process. The summaries produced by TextRank using graph-based ranking algorithms described above are evaluated.

Table 4 shows the results obtained when using graphs that are: (a) undirected, (b) directed forward, or (c) directed backward. Table 5 shows the results obtained on this data set by the top 5 (out of 15) performing systems participating in the single document summarization task at DUe 2002. It also lists the baseline performance, computed for 100-word summaries generated by taking the first sentences in each article.

TABLE 4

| | Graph | | |
| --- | --- | --- | --- |
| Algorithm | Undirected | Forward Directed | Backward Directed |
| HITS$^W_A$ | 0.4912 | 0.4584 | 0.5023 |
| HITS$^W_R$ | 0.4912 | 0.5023 | 0.4584 |
| POS$^W_P$ | 0.4878 | 0.4538 | 0.3910 |
| POS$^W_W$ | 0.4878 | 0.3910 | 0.4538 |
| PageRank | 0.4904 | 0.4202 | 0.5008 |

TABLE 5

| Top 5 Systems + Baseline | | | | | |
| --- | --- | --- | --- | --- | --- |
| S27 | S31 | S28 | S21 | S29 | Baseline |
| 0.5011 | 0.4914 | 0.4890 | 0.4869 | 0.4681 | 0.4799 |

The TextRank approach to sentence extraction described above (e.g. the method 700) succeeds in identifying the most important sentences in a text based on information exclusively drawn from the text itself. Unlike other supervised systems, which attempt to learn what makes a good summary by training on collections of summaries built for other articles, TextRank is fully unsupervised, and relies only on the given text to derive an extractive summary. Among all algorithms, the HITS A and PageRank algorithms provide the best performance when implemented in the method 700, at par with the best performing system from DUe 20028. This demonstrates that graph-based ranking algorithms, previously found successful in Web link analysis, can be turned into a state-of-the-art tool for sentence extraction when applied to graphs extracted from texts. Text Rank also goes beyond the sentence "connectivity" in a text. For instance, sentence 15 in the example provided above would not be identified as "important" based on the number of connections it has with other vertices in the graph, but it is identified as "important" by TextRank (and by humans—see the reference summaries displayed in the same figure). Another important aspect of TextRank is that it gives a ranking over all sentences in a text—which means that it can be easily adapted to extracting very short summaries, or longer more explicative summaries, consisting of more than 100 words.

Embodiments of the invention described above may have a number of advantages over conventional methods of natural language processing. For example, TextRank does not only rely on the local context of a text unit (e.g. a vertex), but rather it takes into account information recursively drawn from the entire text (graph). Through the graphs it builds on texts, TextRank identifies connections between various entities in a text, and implements the concept of recommendation. A text unit recommends other related text units, and the strength of the recommendation is recursively computed based on the importance of the units making the recommendation. For instance, in the keyphrase extraction application, co-occurring words recommend each other as important, and it is the common context that may, at least in part, enable the identification of connections between words in text. For finding the meaning of all words in open text, TextRank combines together information drawn from the entire text (graph), and tries to identify those vertices (synsets) that are of highest importance for the text unity and understanding. In the process of identifying important sentences in a text, a sentence recommends another sentence that addresses similar concepts as being useful for the overall understanding of the text. The sentences that are highly recommended by other sentences in the text are likely to be more informative for the given text, and will be therefore given a higher score.

An analogy can be also drawn with PageRank's "random surfer model", where a user surfs the Web by following links from any given Web page. In the context of text modeling, TextRank implements what we refer to as "text surfing," which relates to the concept of text cohesion: from a certain concept C in a text, we are likely to "follow" links to connected concepts—that is, concepts that have a relation with the current concept C (be that a lexical or semantic relation). This also relates to the "knitting" phenomenon: facts associated with words are shared in different parts of the discourse, and such relationships serve to "knit" the discourse together.

Through its iterative mechanism, TextRank goes beyond simple graph connectivity, and it is able to score text units based also on the "importance" of other text units they link to. The text units selected by TextRank for a given application are the ones most recommended by related text units in the text, with preference given to the recommendations made by most influential ones, i.e. the ones that are in turn highly recommended by other related units. The underlying hypothesis is that in a cohesive text fragment, related text units tend to form a "Web" of connections that approximates the model humans build about a given context in the process of discourse understanding.

Accordingly, TextRank, i.e. an application of graph-based ranking model to text processing, can be successfully used for natural language applications. For example, algorithms originally designed for content-independent Web link analysis or for social networks may be turned into a useful source of information for language processing tasks when applied to graphs extracted from natural language texts. In various embodiments, TextRank may be implemented in unsupervised approaches for word sense disambiguation, for keyword and/or sentence extraction. The accuracy achieved by TextRank in these applications is competitive with that of previously proposed state-of-the-art algorithms. Moreover, other applications that require a ranking over text units are likely to be successfully solved with the TextRank model. TextRank does not require deep linguistic knowledge, nor domain or language specific annotated corpora, which makes it highly portable to other domains, genres, or languages.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of processing at least one natural language text using a graph, comprising:
    selecting, using a processing unit, a plurality of text units from said at least one natural language text:
    associating, using the processing, unit, the plurality of text units with a plurality of graph nodes such that each graph node corresponds to one of the text units selected from said at least one natural language text;
    determining, using the processing unit, at least one connecting relation between at least two of the plurality of text units:
    associating, using the processing unit, the at least one connecting relation with at least one graph edge connecting at least two of the plurality of graph nodes:
    constructing, using the processing unit, a graph using only the plurality of graph nodes that correspond to one of the text units selected from said at least one natural language text and said at least one graph edge; and
    determining, using the processing unit, at least one ranking by applying a graph-based ranking algorithm to the graph, wherein determining the at least one ranking comprises ranking the plurality of graph nodes based upon the at least one graph edge so that the ranking represents the relative importance, within the natural language text, of the text units associated with the graph nodes, and wherein ranking the plurality of graph nodes based upon the at least one graph edge comprises:
    assigning a plurality of first scores to the plurality of graph nodes;
    defining a relationship between a second score of each graph node and second scores, of graph nodes coupled to each graph node by a graph edge; and
    determining a plurality of second scores associated with the plurality of graph nodes by applying an iterative recursive algorithm starting with the first plurality of scores and iterating until the relationship is satisfied.

2. The method of claim 1, wherein ranking the graph nodes comprises sorting the second plurality of scores to produce a plurality of rankings associated with the plurality of graph nodes.

3. A method of processing at least one natural language text using a graph, comprising:
    selecting, using a processing unit, a plurality of text units from said at least one natural language text:
    associating, using the processing unit, the plurality of text units with a plurality of graph nodes such that each graph node corresponds to one of the text units selected from said at least one natural language text;
    determining, using the processing unit, at least one connecting relation between at least two of the plurality of text units;
    associating, using the processing unit, the at least one connecting relation with at least one graph edge connecting at least two of the plurality of graph nodes;
    constructing, using the processing unit, a graph using only the plurality of graph nodes that correspond to one of the text units selected from said at least one natural language text and said at least one graph edge; and
    determining, using the processing unit, at least one ranking by applying a graph-based ranking algorithm to the graph, wherein said at least one graph edge comprises a plurality of graph edges and wherein determining said at least one ranking comprises ranking the graph edges based upon the plurality of graph nodes and wherein ranking the graph edges based upon the plurality of graph nodes comprises:

assigning a first score to each graph edge;

defining a relationship between a second score of each graph edge and second scores of graph edges coupled to a common graph node; and determining a second score associated with each graph edge by applying an iterative recursive algorithm and iterating until the relationship is satisfied.

4. The method of claim 1 or 3, further comprising selecting at least one keyword from the plurality of text units based upon the rankings.

5. The method of claim 1 or 3, wherein the plurality of text units comprises a plurality of sentences, and comprising selecting at least one of the plurality of sentences based upon the rankings.

6. The method of claim 5, further comprising forming a summary of the natural language text, the summary comprising the at least one selected sentence.

7. The method of claim 5, further comprising forming at least one summary of a plurality of natural language texts by combining sentences having the highest rankings determined using the rankings associated with the plurality of sentences in the plurality of texts.

8. The method of claim 1 or 6, further comprising selecting at least one word sense associated with at least one of the plurality of text units based upon the rankings.

9. The method of claim 3, wherein ranking the graph edges comprises sorting the second scores to rank the graph edges.

10. A method of disambiguating word senses in at least one natural language text using a graph, comprising:

selecting, using a processing unit, a plurality of text units from said at least one natural language text;

associating, using the processing unit, at least one word sense with each text unit selected from said at least one natural language text;

associating, using the processing unit, the plurality of word senses with a plurality of graph nodes such that each graph node corresponds to one of the word senses that is associated with a text unit selected from said at least one natural language text;

determining, using the processing unit, at least one connecting relation between at least two of the plurality of word senses;

associating, using the processing unit, said at least one connecting relation with at least one graph edge connecting at least two of the plurality of graph nodes;

constructing, using the processing unit, a graph using only the plurality of graph nodes that are associated with one of the text units selected from said at least one natural language text and said at least one graph edge ranking, using the processing unit, the plurality of graph nodes by applying a graph-based ranking algorithm to the graph so that the ranking represents the relative importance, within said at least one natural language text, of the word senses associated with the text units; and selecting, using the processing unit, one word sense for each text unit based on the plurality of rankings.

11. The method of claim 10, wherein selecting the plurality of text units from the natural language text comprises selecting a plurality of open-class words from said at least one natural language text.

12. The method of claim 10, wherein associating at least one word sense with each text unit comprises determining at least one of a synonym word, word phrase, concept, and a definition associated with each text unit.

13. The method of claim 12, wherein determining the at least one synonym word, word phrase, concept, or definition comprises determining the at least one synonym word, word phrase, concept, or definition based upon a lexical knowledge base.

14. The method of claim 10, wherein determining the at least one connecting relation between at least two of the plurality of word senses comprises determining the at least one connecting relation between at least two of the plurality of word senses based upon a semantic, lexical, or syntactic relation.

15. The method of claim 14, wherein determining the at least one connecting relation between at least two of the plurality of word senses based upon the semantic, lexical, or syntactic relation comprises determining the at least one connecting relation between at least two of the plurality of word senses based on hypernymy, hyponomy, meronomy, holonomy, entailment, causality, attribute, and pertainimy, or based on co-occurrence information from a raw or annotated corpus.

16. The method of claim 15, wherein determining the at least one connecting relation between at least two of the plurality of word senses comprises forming a coordinate connecting relation based on a plurality of semantic relations.

17. The method of claim 10, wherein determining the at least one connecting relation between at least two of the plurality of word senses comprises forming a connecting relation between co-occurring text units.

18. The method of claim 10, wherein ranking the plurality of graph nodes comprises:

assigning a plurality of first scores to the plurality of graph nodes;

defining a relationship between a second score of each graph node and second scores of graph nodes coupled each graph node by a graph edge; and determining a plurality of second scores associated with the plurality of graph nodes by applying an iterative recursive algorithm to the first plurality of scores and iterating until the relationship is satisfied.

19. The method of claim 10, wherein selecting one word sense for each text unit based on the plurality of rankings comprises selecting the word sense having the highest ranking associated with each text unit.

20. The method of claim 10, wherein selecting one word sense for each text unit based on the plurality of rankings comprises selecting one word sense for each text unit based on the plurality of rankings and at least one of a Lesk algorithm and a sense frequency.

21. The method of claim 10, wherein selecting one word sense for each text unit based on the plurality of rankings comprises selecting one word sense for each text unit using at least one of an uninformed and an informed algorithm.

22. A method of keyword extraction from at least one natural language text using a graph, comprising:

selecting, using a processing unit, a plurality of text units from said at least one natural language text;

associating, using the processing unit, the plurality of text units with a plurality of graph nodes so that each graph node is associated with one of the plurality of text units selected from said at least one natural language text;

determining, using the processing unit, at least one connecting relation between at least two of the plurality of text units;

associating, using the processing unit, the at least one connecting relation with at least one graph edge connecting at least two of the plurality of graph nodes;

constructing, using the processing unit, a graph using only the plurality of graph nodes that are associated with one of the text units selected from said at least one natural language text and said at least one graph edge;

ranking, using the processing unit, the plurality of graph nodes by applying a graph-based ranking algorithm to the graph; and determine, using the processing unit, at least one keyword based on the plurality of text units and the plurality of rankings.

23. The method of claim 22, wherein selecting the plurality of text units from the natural language text comprises determining at least one sequence of at least one lexical unit extracted from the natural language text.

24. The method of claim 22, wherein associating the plurality of text units with the plurality of graph nodes comprises associating the plurality of text units with the plurality of graph nodes based upon at least one syntactic or lexical filter.

25. The method of claim 22, wherein determining at least one connecting relation between at least two of the plurality of text units comprises determining at least one connecting relation based on a co-occurrence relation.

26. The method of claim 22, wherein determining at least one connecting relation based on the co-occurrence relation comprises determining the at least one connecting relation based on a co-occurrence relation controlled by a distance between word occurrences.

27. The method of claim 22, wherein ranking the plurality of graph nodes comprises:

assigning a plurality of first scores to the plurality of graph nodes;

defining a relationship between a second score of each graph node and second scores of graph nodes coupled each graph node by a graph edge; and determining a second plurality of scores associated with the plurality of graph nodes by applying an iterative recursive algorithm starting with the plurality of first scores and iterating until the relationship is satisfied.

28. The method of claim 22, wherein determining at least one keyword based on the plurality of text units and the plurality of rankings comprises sorting the graph nodes based upon the plurality of rankings.

29. The method of claim 28, wherein determining the at least one keyword comprises selecting at least one keyword based upon the ranking of the graph nodes.

30. The method of claim 29, wherein determining the at least one keyword comprises forming at least one multi-word key word from the selected keywords.

31. The method of claim 30, wherein forming at least one multi-word keyword comprises combining a plurality of adjacent selected keywords.

32. A method of sentence extraction from at least one natural language text using a graph, comprising:

selecting, using the processing unit, a plurality of sentences from said at least one natural language text;

associating, using the processing unit, the plurality of sentences with a plurality of graph nodes so that each graph node is associated with one of the plurality of sentences selected from said at least one natural language text;

determining, using the processing unit, at least one connecting relation between at least two of the plurality of sentences;

associating, using the processing unit, the at least one connecting relation with at least one graph edge connecting at least two of the plurality of graph nodes;

constructing, using the processing unit, a graph using only the plurality of graph nodes that are associated with one of the text units selected from said at least one natural language text and said at least one graph edge;

ranking, using the processing unit, the plurality of graph nodes by applying a graph-based ranking algorithm to the graph; and selecting, using the processing unit, at least one of the plurality of sentences based on the plurality of text units and the plurality of rankings.

33. The method of claim 32, wherein determining at least one connecting relation between at least two of the plurality of sentences comprises determining at least one connecting relation based upon a similarity relation between the at least two of the plurality of sentences.

34. The method of claim 33, wherein determining at least one connecting relation based upon the similarity relation comprises determining at least one connecting relation as a function of contents overlap between at least two of the plurality of sentences.

35. The method of claim 33, wherein determining at least one connecting relation based upon the similarity relation comprises determining a number of common tokens in the at least two of the plurality of sentences.

36. The method of claim 33, wherein determining at least one connecting relation based upon the similarity relation comprises applying a syntactic or lexical filter to the plurality of sentences.

37. The method of claim 32, wherein associating the at least one connecting relation with at least one graph edge comprises associating a weight with each graph edge.

38. The method of claim 37, wherein associating the weight with each graph edge comprises determining the weight based upon the at least one connecting relation.

39. The method of claim 32, further comprising representing the graph as at least one of an undirected graph, a forward directed graph, and a backward directed graph.

40. The method of claim 32, wherein ranking the plurality of graph nodes comprises:

assigning a plurality of first scores to the plurality of graph nodes;

defining a relationship between a second score of each graph node and second scores of graph nodes coupled each graph node by a graph edge; and determining a plurality of second scores associated with the plurality of graph nodes by applying an iterative recursive algorithm starting with the plurality of first scores and iterating until the relationship is satisfied.

41. The method of claim 40, wherein ranking the graph nodes comprises sorting the sentences in reverse order based upon the second plurality of scores.

42. The method of claim 41, wherein selecting at least one of the plurality of sentences comprises selecting a selected number of sentences having the highest rankings.

43. A method for graphical visualization of a natural language text, comprising:

selecting, using a processing unit, a plurality of text units from the natural language text;

associating, using the processing unit, the plurality of text units with a plurality of graph nodes so that each graph node is associated with one of the text units selected from the natural language text;

determining, using the processing unit, at least one connecting relation between at least two of the plurality of text units;

associating, using the processing unit, the at least one connecting relation with at least one graph edge connecting at least two of the plurality of graph nodes;

constructing, using the processing unit, a graph using only the plurality of graph nodes that are associated with one of the text units selected from the natural language text and said at least one graph edge;

ranking, using the processing unit, the plurality of graph nodes by applying a graph-based algorithm to the graph; and providing, using the processing unit, a visual indication for each text unit based on the plurality of rankings.

44. The method of claim 43, wherein providing the visual indication comprises displaying at least one text unit using at least one color.

45. The method of claim 44, wherein displaying the at least one text unit using at least one color comprises displaying the at least one text unit using a plurality of colors representing the plurality of rankings.

46. The method of claim 43, comprising:

determining at least one keyword based on the plurality of text units and the plurality of rankings; and providing at least one visual indication associated with the at least one keyword.

47. The method of claim 43, comprising:

selecting at least one sentence based on the plurality of text units and the plurality of rankings; and providing at least one visual indication associated with the at least one sentence.

\* \* \* \* \*